(12) United States Patent
Caldwell et al.

(10) Patent No.: US 7,167,454 B2
(45) Date of Patent: Jan. 23, 2007

(54) RADIO COMMUNICATION SYSTEM

(75) Inventors: Richard J. Caldwell, Reigate (GB); Robert Fifield, Redhill (GB); David H. Evans, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 671 days.

(21) Appl. No.: 09/773,418

(22) Filed: Feb. 1, 2001

(65) Prior Publication Data

US 2001/0012275 A1 Aug. 9, 2001

(30) Foreign Application Priority Data

Feb. 8, 2000 (GB) ................... 0002735.9

(51) Int. Cl.
*H04B 7/005* (2006.01)
(52) U.S. Cl. .............. 370/278; 370/345; 370/501; 455/13.3; 455/517
(58) Field of Classification Search ............... 370/231, 370/236, 278–280, 282, 287, 294, 311, 329, 370/332, 356, 428, 456, 252, 253; 455/10, 455/13.3, 65, 65.1
See application file for complete search history.

(56) References Cited

U.S. PATENT DOCUMENTS

| | | | | | |
|---|---|---|---|---|---|
| 5,371,734 | A | * | 12/1994 | Fischer ................... | 370/311 |
| 5,689,245 | A | * | 11/1997 | Noreen et al. ........ | 340/825.49 |
| 5,771,463 | A | * | 6/1998 | Lehmusto et al. ....... | 455/524 |
| 5,822,682 | A | * | 10/1998 | Schroderus et al. ....... | 455/63.3 |
| 5,903,618 | A | * | 5/1999 | Miyake et al. ............. | 375/356 |
| 5,995,500 | A | * | 11/1999 | Ma et al. .................. | 370/337 |
| 6,084,919 | A | * | 7/2000 | Kleider et al. ............ | 375/285 |
| 6,415,146 | B1 | * | 7/2002 | Capece ..................... | 455/517 |
| 6,484,027 | B1 | * | 11/2002 | Mauney et al. ............ | 455/421 |
| 6,580,704 | B1 | * | 6/2003 | Wellig et al. .............. | 370/338 |

FOREIGN PATENT DOCUMENTS

| EP | 656735 A2 * | 6/1995 |
|---|---|---|
| EP | 0996261 A2 | 4/2000 |
| EP | 1227629 A1 * | 7/2002 |

OTHER PUBLICATIONS

Eidson, J.C. et al., "Sharing a Common Sense of Time," IEEE Instrumentation & Measurement Magazine, Mar. 2003, vol. 6, iss 1, pp. 26-32.*

* cited by examiner

*Primary Examiner*—Seema S. Rao
*Assistant Examiner*—Donald L Mills

(57) ABSTRACT

In a radio communication system comprising a plurality of stations (100a,100b,100c) operating in a peer-to-peer mode, each station stores information relating to the transmission parameters of other stations. Such information may include the frequency offset and received signal strength of signals from the other stations. One station acts as central controller and allocates time slots for transmission from a first station (100a) to a second station (100b). Before the first station (100a) receives a signal from the second station (100b) it makes initial adjustments to its receiver circuitry depending on the stored information about previous signals received from that station (100b). This simplifies the task of adjusting the receiver circuitry during the preamble of the signal transmitted by the second station (100b).

15 Claims, 1 Drawing Sheet

RADIO COMMUNICATION SYSTEM

The present invention relates to a radio communication system comprising a plurality of stations which may communicate with one another. Although the present invention is described with particular reference to a HIPERLAN/2 system, it is applicable to a wide range of other communication systems in which peer-to-peer communications are possible.

One example of such a communication system is HIPERLAN/2 (HIgh PErformance Radio Local Area Network type 2), currently being standardised by the European Telecommunications Standards Institute (ETSI). Such a system uses radio waves instead of a cable as the transmission medium for connecting stations. One mode of operation of HIPERLAN/2 permits peer-to-peer networking in which two stations can exchange data directly, instead of via an uplink transmission from the first station to a primary station and a downlink transmission from the primary station to the second station.

In a HIPERLAN/2 system, one of the stations assumes the role of a central controller which allocates transmission time slots to stations requiring them and broadcasts information about this time slot allocation information. Hence, each station in a peer-to-peer network knows the time slots in which it may transmit and the respective station to which it may transmit in each of these time slots. Similarly, each station knows the time slots in which it is to receive and the respective station from which it is to receive in each of these time slots.

HIPERLAN/2 transmissions use a conventional Orthogonal Frequency Division Multiplexing (OFDM) scheme with 48 (out of 64) sub-carriers used for data transmission and 4 sub-carriers for pilot signals. A variety of modulation schemes are possible, enabling data rates of between 6 and 54 Mbit/s (with BPSK and 64QAM modulation respectively).

Data is transmitted between stations in short bursts comprising a preamble of length 16 µs, subdivided into three sections, and one or more data blocks. During the preamble the receiving station's circuitry has to lock on to the received signal. The first section of the preamble comprises five specific OFDM symbols transmitted on every fourth sub-carrier, having a total duration of 4 µs. This section enables the receiving station to determine appropriate Automatic Gain Control (AGC) settings.

The second section of the preamble comprises another five specific OFDM symbols, again transmitted on every fourth carrier and having a total duration of 4 µs. This section enables the receiving station to determine the frequency offset between it and the transmitting station. The first four symbols are identical, enabling the frequency offset to be determined by observation of any rotation of the phase of the received signal—with no frequency offset the phase should remain constant.

The very short time periods provided in the preamble for determining the AGC setting and frequency offset place considerable demands on the receiver circuitry.

An object of the present invention is to reduce these demands placed on the receiver circuitry.

According to a first aspect of the present invention there is provided a radio communication system comprising a controller and a plurality of stations, each station comprising transmission and reception circuitry, in which peer-to-peer communication between stations takes place in time slots allocated by the controller, wherein a receiving station has means for storing information relating to a transmission parameter of each of the others of the plurality of stations and means for adjusting its receiver circuitry prior to reception of a signal from a transmitting station depending on the stored information relating to the transmission parameter of the transmitting station.

According to a second aspect of the present invention there is provided a station for use in a radio communication system comprising a controller and a plurality of stations, each station comprising transmission and reception circuitry, in which peer-to-peer communication between stations takes place in time slots allocated by the controller, wherein the station has means for storing information relating to a transmission parameter of each of the others of the plurality of stations and means for adjusting its receiver circuitry prior to reception of a signal from a transmitting station depending on the stored information relating to the transmission parameter of the transmitting station.

According to a third aspect of the present invention there is provided a method of operating a radio communication system comprising a controller and a plurality of stations, each station comprising transmission and reception circuitry, in which peer-to-peer communication between stations takes place in time slots allocated by the controller, wherein a receiving station stores information relating to a transmission parameter of each of the others of the plurality of stations and adjusts its receiver circuitry prior to reception of a signal from a transmitting station depending on the stored information relating to the transmission parameter of the transmitting station.

The present invention is based upon the recognition, not present in the prior art, that storage of parameters such as frequency offset and received power level for a plurality of stations in a peer-to-peer network considerably reduces the demands placed on the receiver circuitry in a station.

Embodiments of the present invention will now be described, by way of example, with reference to the accompanying drawings, wherein.

Figure 1:
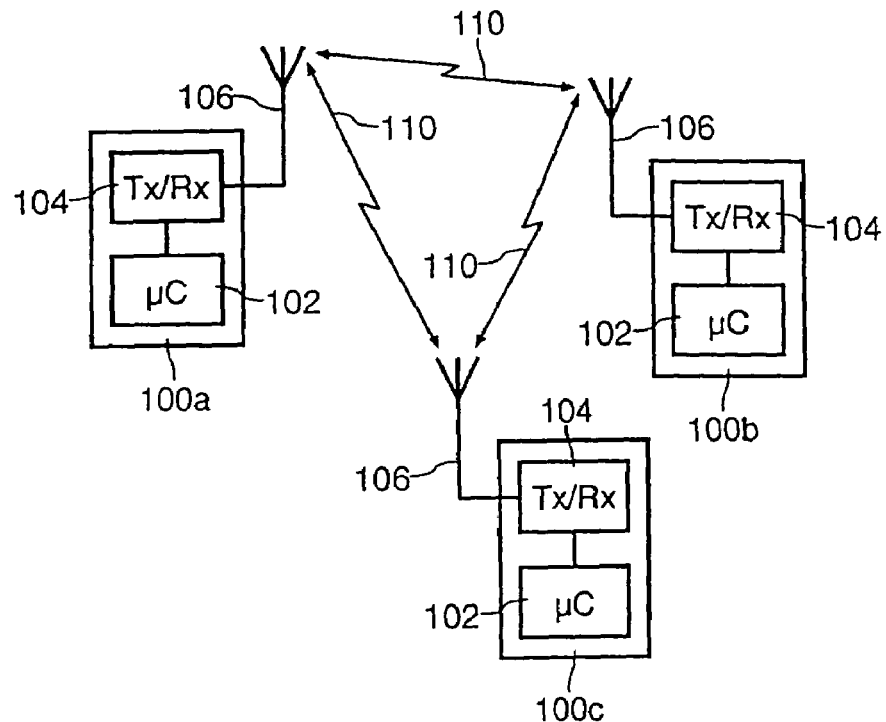
FIG. 1 is a block schematic diagram of a radio communication system.

Referring to FIG. 1, a peer-to-peer radio communication system comprises a plurality of stations 100a,100b,100c. The stations in this example are all identical, although one of them will have assumed the role of controller. This selection may be done in several ways, for example either by negotiation between the stations or by the first station to be activated taking the role of controller. Each station 100a, 100b,100c comprises a microcontroller (µC) 102 and transceiver means (Tx/Rx) 104 connected to antenna means 106. Communication between stations 100a,100b,100c takes place on a radio channels 110.

A typical example of such a system is an in-home network, which may for example include stations 100a,100b, 100c in a television, a video recorder, a hi-fi system and a computer. Alternatively, one or more of the stations 100a, 100b,100c may be stand-alone.

In a system made in accordance with the present invention, the microcontroller 102 in each station 100a (or 100b or 100c) stores information about signals received from the other stations 100b,100c (or 100a,100c or 100a,100b), participating in the local network. In its simplest form this information could simply be the signal strength and/or the frequency offset of the last received signal from a particular station, for example station 100b or 100c in the case of the station 100a storing the information. By making use of this information, when a first station 100a is scheduled by the central controller to receive a transmission from a second station 100b it uses the stored information to make an initial adjustment of the frequency offset and gain of its receiver circuitry. Since these parameters will typically change quite slowly, the adjustments made by the receiver circuitry of the first station 100a during reception of the preamble are significantly reduced by this initial adjustment. Hence the demands on the receiver circuitry are also significantly reduced and the probability that the receiver is correctly adjusted to receive data blocks from the second station 100b is increased.

Other parameters relating to signals received from stations 100b,100c could also be stored. For example, if the first station 100a has an electronically steerable antenna 106 it could also store information on the direction of a second station 100b. This would enable the antenna 106 to be adjusted for optimum reception of signals from the second station 100b, improving the signal to noise ratio of the received signal. The skilled person will readily appreciate that various other parameters could usefully be stored depending on the type of system and the standard according to which it operates.

An improvement to the system disclosed above results if each station 100a stores information relating to a number of previous transmissions by each of the other stations 100b, 100c together with the time at which they were received. In this way the history of the behaviour of the signals from a particular station 100b is available, enabling a more accurate initial adjustment of the receiver circuitry of the first station 100a. For example, from measurements of the frequency offset of the second station 100b and knowledge of the present time enable the first station 100a to predict more accurately the expected frequency offset at the start of a transmission. The simplest example of this would be to determine a first order correction to the frequency offset from the time since the last transmission from the second station 100b together with the rate of drift of its frequency offset.

Figure 2:
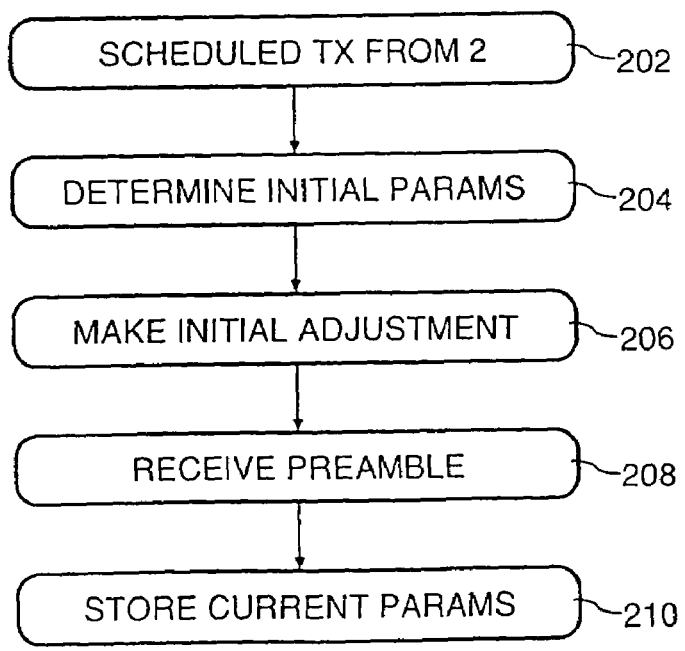
FIG. 2 is a flow chart illustrating a method in accordance with the present invention for operating a station.

A method of operating the first station 100a in accordance with the present invention is illustrated in the flow chart of FIG. 2. The method begins, at step 202, when the first station 100a determines that it is due to receive a transmission from the second station 100b. The first station 100a then determines, at step 204, suitable values for its receiver circuitry as described above. These values are then used, at step 206, to make an initial adjustment of the receiver circuitry. When this has been done, the first station 100a receives a preamble from the second station 100b, during which the receiver parameters are further adjusted. Finally, at step 210, the newly-determined receiver parameters are stored for later use and the data blocks are received from the second station 100b.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system comprising a controller and plurality of end user stations, each end user station comprising transmission and reception circuitry, in which peer-to-peer communication between end user stations takes place in time slots allocated by the controller, wherein a receiving end user station has means for storing information relating to a transmission parameter of each of the others of the plurality of end user stations and is configured to form, and record, a respective parameter history for each of the plural end user stations from which said receiving end user station has received a prior transmission, and means for adjusting its receiver circuitry prior to reception of a signal from a transmitting end user station using the recorded parameter history of the transmitting end user station.

2. The system as claimed in claim 1, wherein the receiving end user station has means for storing a plurality of values for each transmission parameter relating to signals received at different times and means for operating on a plurality of these values to compensate for drift in the value of the transmission parameter.

3. A end user station for use in a radio communication system comprising a controller and a plurality of end user stations, each end user station comprising transmission and reception circuitry, in which peer-to-peer communication between end user stations takes place in time slots allocated by the controller, wherein said end user station for use has means for storing information relating to a transmission parameter of each of the others of the plurality of end user stations and is configured to use the information to form, and record, a respective parameter history for each of the plural end user stations from which said end user station for use has received a prior transmission, and has means for adjusting its receiver circuitry prior to reception of a signal from a transmitting end user station using the recorded parameter history of the transmitting end user station.

4. The end user station as claimed in claim 3, wherein a transmission parameter is the frequency offset of signals from the transmitting end user station.

5. The end user station as claimed in claim 3, wherein a transmission parameter is the signal strength of signals from the transmitting end user station.

6. The end user station as claimed in claim 1, wherein means are provided for storing a plurality of values for each transmission parameter relating to signals received at different times and for operating on a plurality of these values to compensate for drift in the value of the transmission parameter.

7. A method of operating a radio communication system comprising a controller and a plurality of end user stations, each end user station comprising transmission and reception circuitry, in which peer-to-peer communication between end user stations takes place in time slots allocated by the controller, wherein a receiving end user station stores information relating to a transmission parameter of each of the others of the plurality of end user stations and uses the information to form, and record, a parameter history for each of the plural end user stations from which said receiving end user station has received a prior transmission, and adjusts its receiver circuitry prior to reception of a signal from a transmitting end user station using the recorded parameter history or the transmitting end user station if said receiving end user station has received the respective prior transmission.

8. The method as claimed in claim 7, wherein a transmission parameter being the frequency offset of signals from the transmitting end user station.

9. The method as claimed in claim 7, wherein a transmission parameter being the signal strength of signals from the transmitting end user station.

10. The method as claimed in claim 1, wherein the receiving end user station storing a plurality of values for each transmission parameter relating to signals received at different times and operating on a plurality of these values to compensate for drift in the value of the transmission parameter.

11. The method as claimed in claim 1, wherein the parameter history includes information from a number of previous transmissions by the other end user stations.

12. The system of claim 1, wherein said means for adjusting performs said adjusting if said receiving end user station has received the respective prior transmission.

13. Said end user station for use according to claim 3, wherein said means for adjusting performs said adjusting if said end user station for use has received the respective prior transmission.

14. A radio communication system comprising:
a plurality of end user stations, each end user station capable of communication between end user stations, wherein a receiving end user station stores transmission parameter information of each of the other end user stations of the plurality of end user stations and is configured to store a respective parameter history for each of the plural end user stations from which said receiving end user station has received a prior transmission, and a processor to adjust a communication parameter prior to reception of a signal from a transmitting end user station using the recorded parameter history of the transmitting end user station.

15. The system of claim 14, wherein said respective parameter history for each of the plural end user stations includes information relating to two or more previous transmissions by each of the other end user stations.

* * * * *

UNITED STATES PATENT AND TRADEMARK OFFICE
CERTIFICATE OF CORRECTION

| | | |
|---|---|---|
| PATENT NO. | : 7,167,454 B2 | Page 1 of 1 |
| APPLICATION NO. | : 09/773418 | |
| DATED | : January 23, 2007 | |
| INVENTOR(S) | : Caldwell et al. | |

It is certified that error appears in the above-identified patent and that said Letters Patent is hereby corrected as shown below:

IN THE CLAIMS

In claim 7, at column 5, line 4, after the word "history", delete "or" and insert therefor --of--.

Signed and Sealed this
Ninth Day of April, 2013

Teresa Stanek Rea
*Acting Director of the United States Patent and Trademark Office*